(12) United States Patent
Immonen et al.

(10) Patent No.: US 12,390,990 B2
(45) Date of Patent: Aug. 19, 2025

(54) USE OF THERMOPLASTIC CELLULOSE COMPOSITE FOR ADDITIVE MANUFACTURING

(71) Applicant: Teknologian tutkimuskeskus VTT Oy, Espoo (FI)

(72) Inventors: Kirsi Immonen, Tampere (FI); Eino Sivonen, Tampere (FI); Sini Metsä-Kortelainen, Espoo (FI); Jarmo Ropponen, Espoo (FI); Pia Willberg-Keyriläinen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 693 days.

(21) Appl. No.: 17/776,277

(22) PCT Filed: Nov. 12, 2020

(86) PCT No.: PCT/FI2020/050745
§ 371 (c)(1),
(2) Date: May 12, 2022

(87) PCT Pub. No.: WO2021/094653
PCT Pub. Date: May 20, 2021

(65) Prior Publication Data
US 2022/0388235 A1 Dec. 8, 2022

(30) Foreign Application Priority Data
Nov. 12, 2019 (FI) ..................... 20195964

(51) Int. Cl.
*B29C 64/141* (2017.01)
*B29K 1/00* (2006.01)
*B33Y 10/00* (2015.01)
*B33Y 70/00* (2020.01)
*B33Y 80/00* (2015.01)
*C08K 5/09* (2006.01)

(52) U.S. Cl.
CPC .............. *B29C 64/141* (2017.08); *C08K 5/09* (2013.01); *B29K 2001/12* (2013.01); *B29K 2001/14* (2013.01); *B29K 2995/0017* (2013.01); *B29K 2995/006* (2013.01); *B33Y 10/00* (2014.12); *B33Y 70/00* (2014.12); *B33Y 80/00* (2014.12)

(58) Field of Classification Search
CPC ........ B29K 2995/0017; B29K 2001/00; B29K 2001/14; B29K 2001/12; B29K 2995/006; B33Y 70/00; B33Y 80/00; B33Y 10/00; C08L 1/02; B29C 64/141; C08K 5/09
See application file for complete search history.

(56) References Cited

U.S. PATENT DOCUMENTS

| | | |
|---|---|---|
| 5,728,824 A | 3/1998 | Narayan et al. |
| 2011/0073008 A1 | 3/2011 | Lee et al. |
| 2016/0369125 A1 | 12/2016 | Ozcan et al. |

FOREIGN PATENT DOCUMENTS

| | | | |
|---|---|---|---|
| CN | 105400166 A | 3/2016 | |
| EP | 3135464 A1 * | 3/2017 | ........... B29C 64/106 |
| JP | 2006036815 A | 2/2006 | |
| WO | WO2012117165 A2 | 9/2012 | |
| WO | WO2016207849 A1 | 12/2016 | |
| WO | WO2017165957 A | 10/2017 | |
| WO | WO-2018089610 A1 * | 5/2018 | ......... B29C 45/0001 |
| WO | WO2018146386 A1 | 8/2018 | |

OTHER PUBLICATIONS

Balart et al: Processing and characterization of high environmental efficiency composites based on PLA and hazelnut shell flour (HSF) with biobased plasticizers derived from epoxidized linseed oil (ELO). Composites Part B, Nov. 28, 2015, vol. 86, pp. 168-177.

Boukerrou et al: The Effect of Chemical Treatment of Cellulose with Epoxidized Soybean Oil (ESO) on the Properties PVC/Cellulose Composites. Molecular Crystals and Liquid Crystals, May 3, 2012, vol. 556 No. 1 pp. 223-232.

O'Donnell et al: Natural fiber composites with plant oil-based resin. Composites Science and Technology, Jul. 1, 2004, vol. 64, No. 9, pp. 1135-1145.

Quiles-Carillo et al: Enhancement of the mechanical and thermal properties of injection-molded polylactide parts by the addition of acrylated epoxidized soybean oil. Materials and Design, Nov. 20, 2017, vol. 140, pp. 54-63.

Wang et al: Preparation of 3D printable micro/nanocellulose-polylactic acid (MNC/PLA) composite wire rods with high MNC constitution. Industrial Crops and Products, Oct. 5, 2017, vol. 109, pp. 889-896.

Wang et al: 3D printing with cellulosic materials. Cellulose, Aug. 2018, vol. 25, pp. 4275-4301.

* cited by examiner

*Primary Examiner* — Randy P Gulakowski
*Assistant Examiner* — Virginia L Stonehocker
(74) *Attorney, Agent, or Firm* — Laine IP Oy

(57) ABSTRACT

The present invention relates to a thermoplastic cellulose composite for additive manufacturing. The composite comprises at least 50 weight-% of total cellulose, a plasticizer, and a coupling agent of an epoxy-modified polyunsaturated fatty acid. The material is fully bio-based and offers improved cellulose content and thermal resistance compared to existing bio-based thermoplastic materials used in additive manufacturing.

16 Claims, 2 Drawing Sheets

USE OF THERMOPLASTIC CELLULOSE COMPOSITE FOR ADDITIVE MANUFACTURING

FIELD

The present invention relates to thermoplastic cellulose-polymer based and cellulose fibre containing all-cellulose composite material for additive manufacturing to be processed straight from composite granules or filaments.

BACKGROUND

The state-of-the-art in current wood based and cellulose based thermoplastic additive manufacturing materials is based on polylactic acid (PLA) or PLA/PHA (polyhydroxy alkanote) or polypropylene (PP) materials filled with different wood powders or ligno-cellulosic materials. The maximum amount of ligno-cellulose is typically 40%. According to our experience even the 40% lignocellulose material composite is quite difficult in printing and tends to stuck on printing device nozzle. Another approach is to use aqueous nanocellulose or cellulose slurry with or without polymer matrix. Those materials are typically not thermoplastic and they have big challenges in control of product shape during drying process, where the printed product can shrink uncontrolled several hundred percentages.

Wang et al. (2018) discuss in their article about 3D-printing technology, also known as additive manufacturing, with cellulose materials. 3D-printing with lignocellulosic materials has been attempted by many researchers, but multiple challenges exist. One of such being thermal decomposition before the lignocellulosic material becomes extrudable.

Patent document US 2016/0369125 relates to thermoset composite having thermoplastic characteristics. It discloses a system solving a typical adhesion challenges in between printed layers and using MFC as structure bringing ingredient. However, it does not disclose using thermoplastic matrix polymer and the resulting product of this method cannot be thermally modified again for example for recycling as material.

Patent document CN 105400166 on the other hand relates to composite materials for 3D-printing. It discloses thermoplastic polylactide (PLA) based composite with micro- and/or nanocellulose. However, there is no coupling agent between cellulose and PLA, whereby this disclosure is not focused on maximising cellulose content in the 3D-printable material.

There is thus a need for a means for increasing the amount of cellulose content in 3D-printable thermoplastic materials and to increase temperature resistance compared to existing, for example PLA-based solutions in the area of additive manufacturing.

SUMMARY OF THE INVENTION

The invention is defined by the features of the independent claims. Some specific embodiments are defined in the dependent claims.

According to an aspect of the present invention, there is provided an improved cellulose material content compared to existing thermoplastic materials used in additive manufacturing.

According to another aspect of the present invention, there is provided improved thermal resistance compared to existing polylactic acid (PLA) based cellulosic composites used in additive manufacturing.

These and other aspects, together with the advantages thereof over known solutions are achieved by the present invention, as hereinafter described and claimed.

The novel use of the thermoplastic composite according to the present invention is mainly characterized by what is stated in claim 1.

Considerable advantages are obtained by means of the invention. For example, the composite material is fully bio-based and consists mainly of pure cellulose and thermoplastic cellulose materials with vegetable based additive. Improved cellulose material content provides advantages relating to processability in the actual additive manufacturing, and for example biodegradability and improved mechanical and thermal properties of the 3D-printed object thereof, when compared to the existing solutions. In addition, the 3D-printed object according to the present invention tends to have better surface quality in terms of smoothness and glossy appearance than 3D-printed PLA-based objects.

Next, the present technology will be described more closely with reference to certain embodiments.

EMBODIMENTS

The present technology provides improved cellulose material content compared to existing thermoplastic materials used in additive manufacturing. In addition, the present technology provides improved thermal resistance compared to for example PLA-based cellulosic composites.

Figure 1:
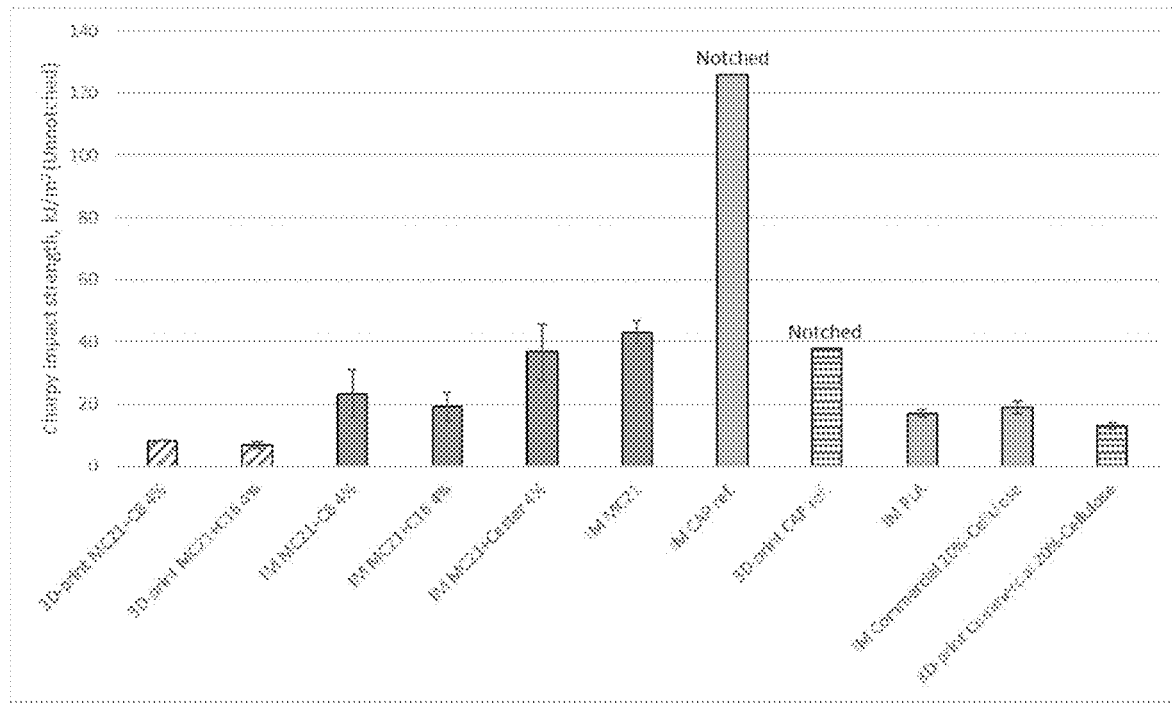
FIG. 1 is a chart showing charpy impact strength ($kJ/m^2$) for different 3D-printed and injection molded (IM) cellulose materials according to the present invention.
Figure 2:
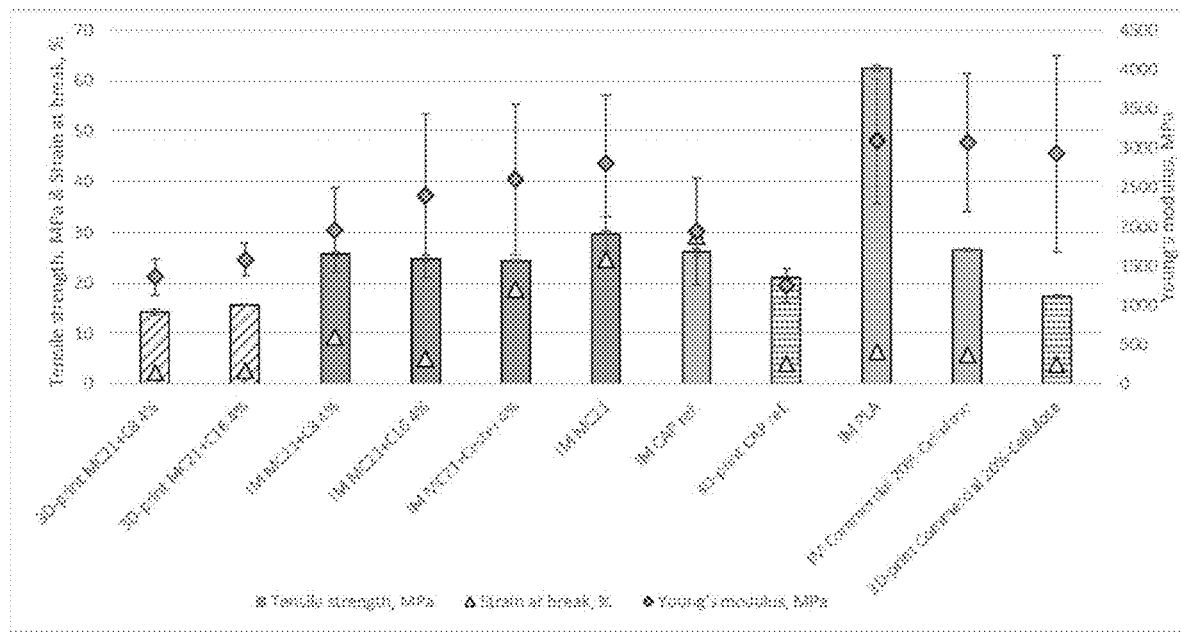
FIG. 2 is a chart showing tensile strength (MPa) and strain (%) for different 3D-printed and injection molded (IM) cellulose materials according to the present invention.

Term "3D-printing" means essentially the same as "additive manufacturing".

Term "all-cellulose material" is herein intended to mean a material, wherein the total cellulose material share is at least 50 weight-%, more preferably at least 60 weight-%, even more preferably at least 70 weight-%, and most suitably at least 80 weight-%.

One purpose of the present invention is maximising the cellulose content in 3D-printable thermoplastic materials.

In order to achieve the desired technical effect(s), one important aspect of the present invention is the cellulose fibre type used in the material. In one preferred embodiment short particle size microcellulose (MC), preferably below 100 μm particle size, without special modification is used. The MC needs to be coupled with a polymeric material during the processing enabling proper connection between the fibre and the polymer, providing also good performance for the material. The coupling agent should be selected so that it helps also MC dispersion properties in polymer and limits the agglomeration. As an example of a suitable polymer matrix, cellulose acetate propionate (CAP) can be used. Cellulose acetate propionate is a very rigid polymer and the limited thermoplasticity is improved by plasticizers in commercial material. Improved plasticity for the CAP-composite can be made also by using inherently thermoplastic cellulose material based on for example the inventors own Thermocell-technology or molar mass controlled cellulose (MMCC). Addition of Thermocell (preferably below 10 weight-%) has shown to improve the printing properties and give smooth surface properties for the 3D printed product.

According to one embodiment of the present invention, suitable polymer matrices for the composite material are cellulose acetate, cellulose acetate propionate and cellulose acetate butyrate, especially cellulose acetate propionate.

According to one embodiment of the present invention, the coupling agent is selected among epoxy modified vegetable oils containing polyunsaturated fatty acids, such as epoxy modified soy oil or epoxy modified linseed oil.

One aspect of the present invention is a thermoplastic cellulose composite for use in additive manufacturing, which comprises at least 50 weight-% of total cellulose, and a coupling agent of a polymeric matrix material. It is preferred that the thermoplastic composite material comprises at least 60 weight-%, more preferably at least 70 weight-%, and most suitably at least 80 weight-% of total cellulose.

According to one embodiment of the present invention, the thermoplastic cellulose composite material comprises a short particle size (below 100 μm) microcellulose (MC) coupled with a polymer matrix. In a preferred embodiment of the present invention, the composite material comprises 20 to 30 weight-% of microcellulose and 0.5 to 5 weight-% of a coupling agent of polymeric matrix material.

In one embodiment of the present invention, the improved plasticity providing Thermocell is molar mass controlled cellulose (MMCC). Such MMCC is manufactured according to a known method by controlling (i.e. decreasing) the molar mass of a cellulose raw material via hydrolysis, excluding total hydrolysis, and by performing a hydroxyalkylation or ester modification, e.g. hydroxypropylation, hydroxyethylation, hydroxybutylation, or esterification with long chain fatty acids (chain length between C6-C30, such as C6-C18) for the molar mass controlled cellulose. The hydrolysis is controlled so that the average molecular mass of the cellulose is reduced at least 60% but not more than 85% from the molecular mass of the starting raw material. It is preferred that the hydrolysis is controlled so that after the hydrolysis the average molecular mass of the cellulose is between 30 to 300 kDa, preferably between 40 to 200 kDa. It should be noted that the molar mass of the cellulose is indeed controlled, whereby the cellulose is not subjected to total hydrolysis.

According to one embodiment of the present invention, the cellulose raw material usable for the thermoplastic cellulose composites is selected for example from native softwood pulp, native hardwood pulp, annual plant pulp, softwood sulphite dissolving grade pulp, hardwood sulphite dissolving grade pulp, ozone treated hydrolyzed pulp or enzyme treated pulp.

According to one embodiment of the present invention the thermoplastic cellulose composite for use in additive manufacturing comprises hydroxypropylated cellulose, hydroxyethylated cellulose, hydroxybutylated cellulose, cellulose esters having fatty acid chain length between C6 to C30, or their mixtures, as plasticizers.

A method for printing a three dimensional objects from the thermoplastic cellulose composite material according to the aforementioned features belongs to the scope of the present invention. The method may be carried out for example by using fused filament fabrication (FFF or FDM) or straight from composite granules. Consequently, a three dimensional object manufactured according to such method is also in the scope of the present invention.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

The present invention provides cellulose-polymer based and cellulose fibre containing materials and solutions usable in additive manufacturing. These materials can be processed straight from composite granules or filaments by using fused filament fabrication.

EXAMPLES

In preparation of cellulose based FDM-filaments 420 g of MC (Arbocell UFC100 from JRS GmbH) was at first mixed in a blender type mixer with 21 g epoxy modified linseed oil (Vikoflex 7190 from Arkema) and dried overnight an oven in 50° C. Also MMCC-materials (C8 and C16) were dried in an oven at 50° C. over night. The matrix polymer Cellidor CP 300.02-16 (Albis Plastics) (CAP) was dried in 80° C. for 2 hours before compounding.

Compounding was made with twin-screw extruder Berstorff ZE 25×33D (Berstorff GmbH, Hanover, Germany). The extruder zone temperatures ranged from 80° C. to 205° C., speed 100 rpm and output 2 kg/h. The residence time of the compound inside the compounder was measured to be approximately 2.5 minutes.

In Example 1 the matrix polymer, MC-mixture and MMCC8 were compounded and granulated. The compound was prepared to FDM suitable filament using The Next 1.0 filament extruder (3devo, Utrecht, Netherlands) with extrusion temperature 178° C. and 12 rpm.

After filament preparation the material was 3D printed to dog bone shaped, 1 mm thick, test bars for tensile testing and 4 mm×10 mm×80 mm test bars for Charpy impact strength test using Prenta Duo XL 3D printing system with extrusion temperature of 200 to 220° C. and printing nozzle having a diameter of 0.8 mm.

Injection molding to dog bone shaped test bars for tensile testing and 4 mm×10 mm×80 mm test bars for Charpy impact strength test was made with Thermo-Haake MiniJet Injection moulding machine (Thermo Fischer Scientific, Waltham, US).

Tensile tests were performed using an Instron 4505 Universal Tensile Tester (Instron Corp., Canton, Massachusetts, USA) and an Instron 2665 Series High Resolution Digital Automatic Extensometer (Instron Corp.) with a 1-kN load cell and a 2 mm/min crosshead speed. Minimum five parallel samples were tested. The tensile tests were performed according to ISO-527 standard, and Charpy impact tests were performed according to ISO-179 standard. Impact strengths were measured for five parallel unnotched specimens in a three-point bend configuration and using a Charpy Ceast Resil 5.5 Impact Strength Machine (CEAST S.p.a., Torino, Italy). The test specimens were kept in standard conditions (23° C., 50% relative humidity) for at least 5 days before testing.

Figure 3:
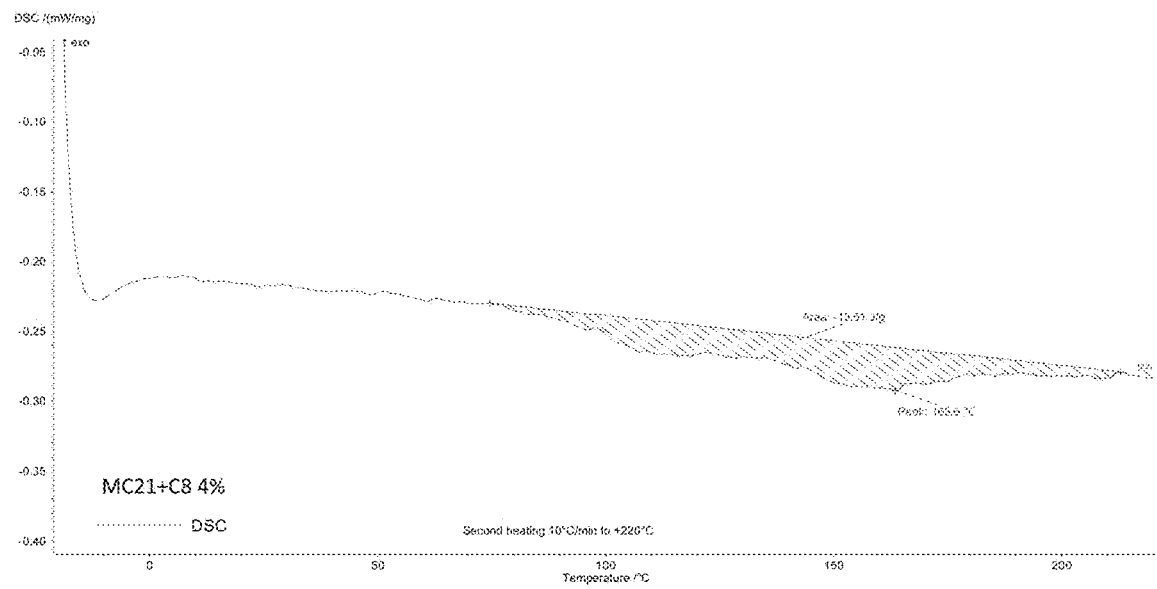
FIGS. 3 and 4 are charts showing DSC (Differential Scanning calorimetry) results from the second heating and cooling cycle for the FDM-filament according to the present invention.
Figure 4:
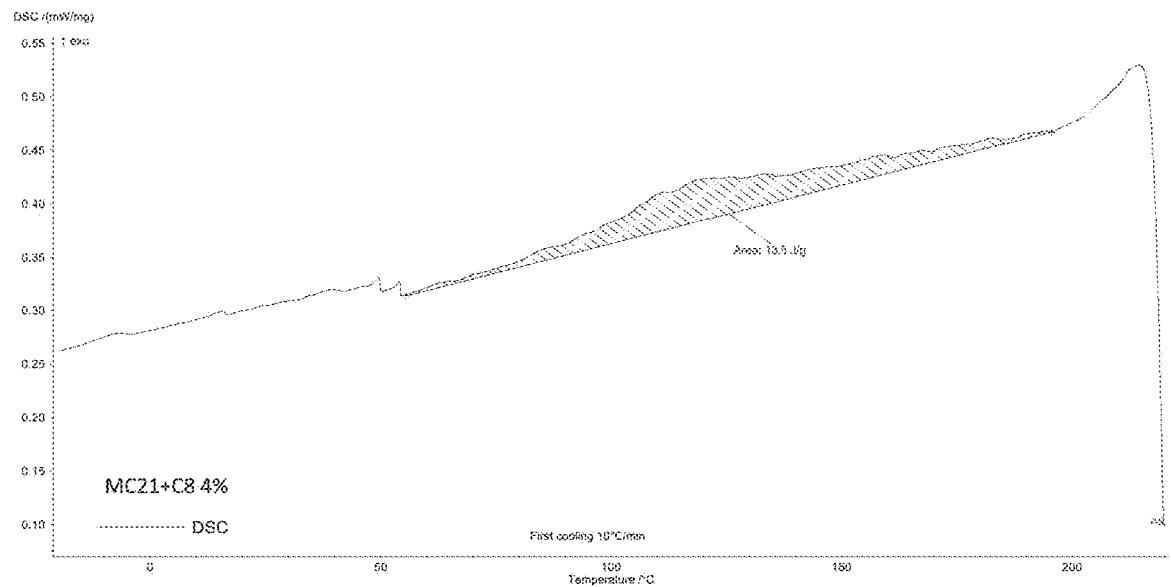

The material temperature behavior was tested using DSC (Differential scanning calorimetry) analysis using NETZSCH DSC 204F1 Phoenix 240-12-0287-L (NEZSCH GmbH, Selb, Germany). The heating profile was 10° C./min from −20° C. to 220° C. followed by cooling 10° C./min to −20° C. Results are presented in FIGS. 3 and 4.

In Example 2 the matrix polymer, MC-mixture and MMCC16 were compounded and granulated. The compound was prepared to FDM suitable filament using filament extruder with printing temperature 180° C. and speed 13 rpm. Test bar printing and injection moulding made similarly as in Example 1. Also testing of materials were preformed similarly as in Example 1.

Reference materials CAP Cellidor CP 300.02-16, Ingeo PLA 2002D and commercial UPM Formi 3D with cellulose fibre content 20% were prepared to test bars similarly as in examples using FDM-printing and injection moulding. Tensile strength testing and Charpy impact strength tests were performed similarly as for materials in examples.

CITATION LIST

Patent Literature

US 2016/0369125
CN 105400166

Non-Patent Literature

Wang Q., Sun J., Yao Q., Ji C., Liu J., Zhu Q., *3D printing with cellulosic materials*, Cellulose (2018) 25:4275-4301, https://doi.org/10.1007/s10570-018-1888-y

The invention claimed is:

1. A three dimensional (3D) printable thermoplastic cellulose composite comprising at least 50 weight-% of total cellulose, a plasticizer, and a coupling agent comprising an epoxy modified polyunsaturated fatty acid, wherein the plasticizer comprises molar mass controlled cellulose having an average molecular mass distribution in a range between 30 and 300 kDa.

2. The thermoplastic cellulose composite according to claim 1, comprising at least 60 weight-%, of total cellulose.

3. The thermoplastic cellulose composite according to claim 1, wherein the total cellulose comprises microcellulose of a particle size below 100 μm.

4. The thermoplastic cellulose composite according to claim 1, comprising 20 to 30 weight-% of microcellulose and 0.5 to 5 weight-% of the coupling agent comprising epoxy modified polyunsaturated fatty acid.

5. The thermoplastic cellulose composite according to claim 1, comprising 2 to 10 weight-% of the plasticizer.

6. The thermoplastic cellulose composite according to claim 1, wherein raw material of the total cellulose is selected from the group consisting of native softwood pulp, native hardwood pulp, annual plant pulp, softwood sulphite dissolving grade pulp, hardwood sulphite dissolving grade pulp, ozone treated hydrolyzed pulp, and enzyme treated pulp.

7. The thermoplastic cellulose composite according to claim 1, further comprising a polymer matrix selected from the group consisting of cellulose acetate, cellulose acetate propionate, and cellulose acetate butyrate.

8. The thermoplastic cellulose composite according to claim 1, wherein the plasticizer comprises hydroxypropylated cellulose, hydroxyethylated cellulose, hydroxybutylated cellulose, cellulose esters having fatty acid chain length between C6 to C30, or their mixtures.

9. A method of forming a three dimensional (3D) object comprising 3D printing the thermoplastic cellulose composite of claim 1 to form the 3D object.

10. A three dimensional object manufactured according to the method of claim 9.

11. The method according to claim 9, wherein the 3D printing is carried out using fused filament fabrication or straight from thermoplastic composite granules.

12. A method for manufacturing a three dimensional (3D) object comprising injection molding the thermoplastic cellulose composite of claim 1 to form the 3D object.

13. A three dimensional object manufactured according to the method of claim 12.

14. A three dimensional (3D) printable thermoplastic cellulose composite comprising at least 50 weight-% of total cellulose, a plasticizer, and a coupling agent comprising an epoxy modified polyunsaturated fatty acid, wherein the plasticizer comprises hydroxypropylated cellulose, hydroxyethylated cellulose, hydroxybutylated cellulose, cellulose esters having fatty acid chain length between C6 to C30, and mixtures thereof.

15. A three dimensional (3D) printable thermoplastic cellulose composite comprising at least 50 weight-% of total cellulose, a plasticizer, and a coupling agent comprising an epoxy modified polyunsaturated fatty acid, wherein the total cellulose comprises microcellulose of a particle size below 100 μm.

16. The thermoplastic cellulose composite according to claim 15, further comprising a polymer matrix selected from the group consisting of cellulose acetate, cellulose acetate propionate, and cellulose acetate butyrate.

\* \* \* \* \*